Jan. 19, 1965 G. N. CARMICHAEL ETAL 3,166,440
APPARATUS FOR COATING ELONGATED BODIES
Filed Dec. 27, 1961 2 Sheets-Sheet 1
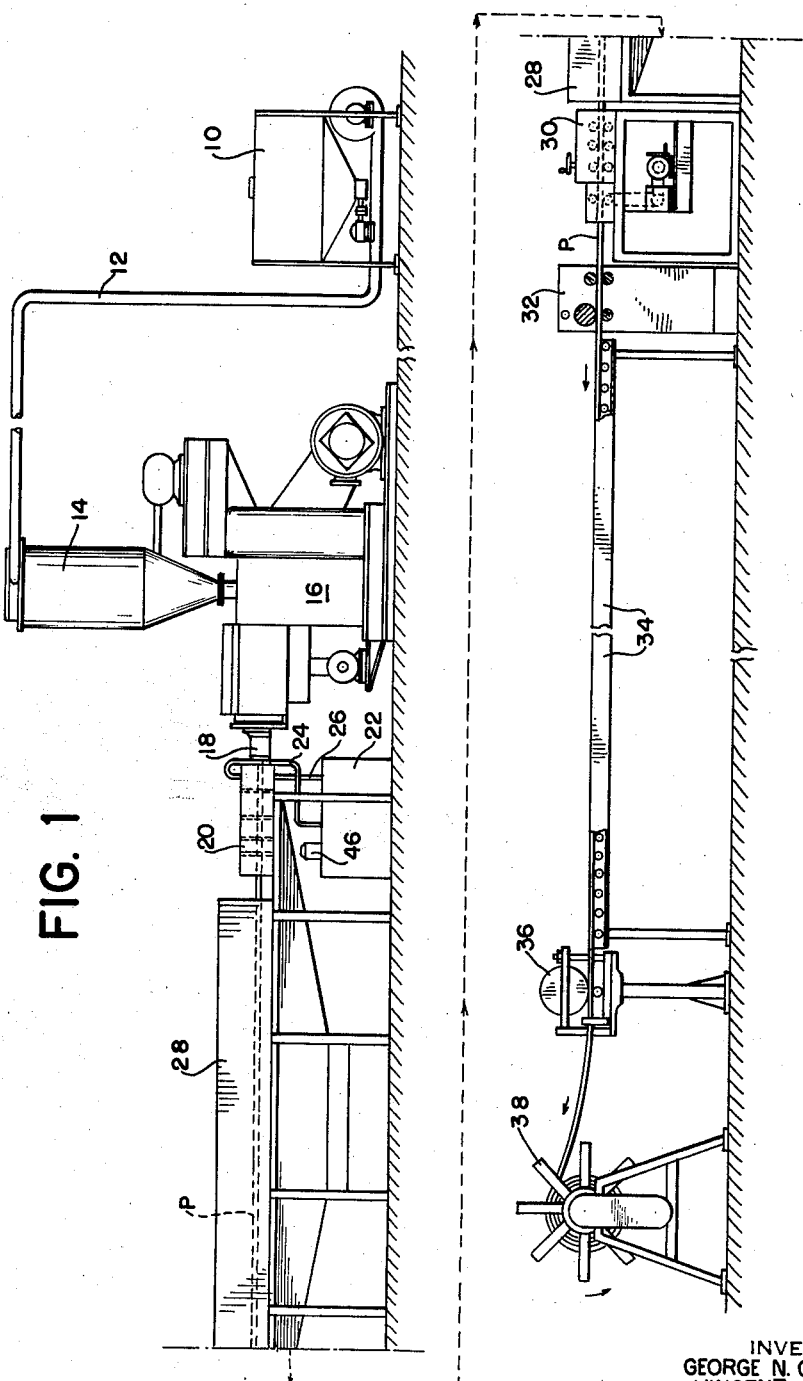
INVENTORS
GEORGE N. CARMICHAEL
VINCENT RYLKA
BY
*Darby & Darby*
ATTORNEYS Jan. 19, 1965
G. N. CARMICHAEL ETAL
3,166,440
APPARATUS FOR COATING ELONGATED BODIES
Filed Dec. 27, 1961
2 Sheets-Sheet 2
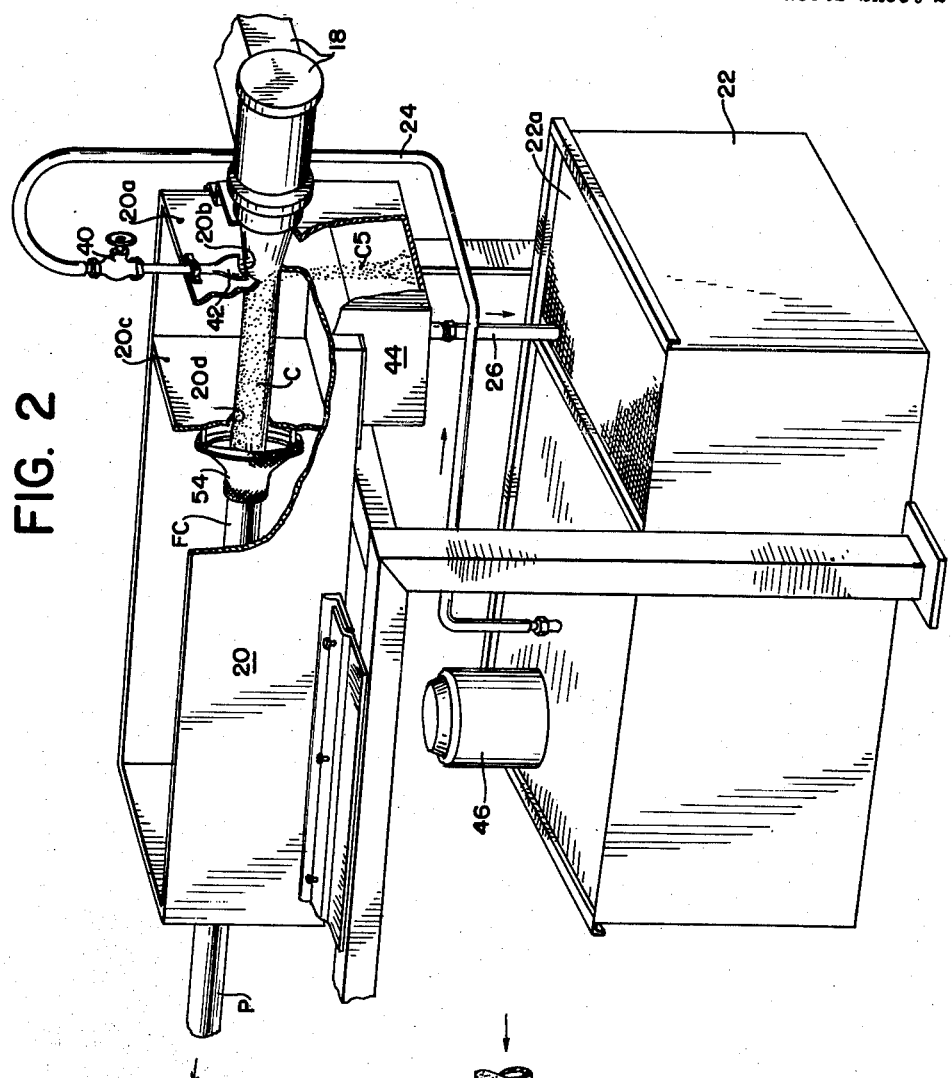
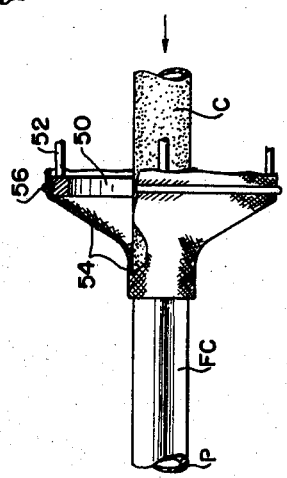
INVENTORS
GEORGE N. CARMICHAEL
VINCENT RYLKA
BY
*Darby & Darby*
ATTORNEYS – # United States Patent Office 3,166,440
Patented Jan. 19, 1965

3,166,440
APPARATUS FOR COATING ELONGATED BODIES
George N. Carmichael, South Amboy, and Vincent Rylka, Nixon, N.J., assignors to Triangle Conduit & Cable Co., Inc., New Brunswick, N.J., a corporation of Delaware
Filed Dec. 27, 1961, Ser. No. 162,529
2 Claims. (Cl. 118—109)

This invention relates to novel apparatus by means of which an exceedingly simple and uniform coating, preferably pigmented, may be applied to elongated bodies, such as pipe, particularly plastic pipe, insulated electrical conductors, rods and the like.

The invention is applicable to all types of coating, including paints, solvent carrying pigments, and the like.

A more specific object of the invention is to provide an apparatus wherein a knit fabric sleeve is used to insure uniform smooth distribution of the coating material on the surface of the elongated body.

More specifically, this knit fabric sleeve may be knit of cotton and other natural or synthetic fibers and may be elasticized in that there may be knit in with such fibers a resilient elastomer suited to the purpose.

In accordance with this invention the principles thereof may be applied as a part of and during the formation of the elongated body, or they may be applied to such a body already formed.

Other and more detailed objects of the invention will be apparent from the following disclosure of one embodiment thereof.

In the accompanying drawings,

FIGURE 1 is a diagrammatic, side elevational view of an apparatus in accordance with this invention, wherein the smoothing of the coating is applied during the manufacture of the elongated body, in this case by extrusion;

FIGURE 2 is an enlarged perspective view of the coating applicator portion of the mechanism of FIG. 1; and FIGURE 3 is a side elevational view with some parts broken away and some parts in section showing the smoothing sleeve by means of which the coating is wiped to a smooth uniform condition.

The subject matter of this invention may be applied to various forms of elongated bodies, preferably but not necessarily, of circular cross-section. Examples of such bodies are plastic pipe and tubing, metal and fibrous tubing, insulated electrical conductors, and similar articles.

As will be apparent as the disclosure proceeds, the nature of the coating composition is not of critical importance to the attainment of the objects of this invention. As those skilled in the art will understand coating composition will vary depending upon the nature of the material of which the elongated bodies are made. For example, in the case of high molecular weight plastic polymers of which plastic pipe or tubing is now commonly made, a wide variety of such materials are presently being used. In order to give this disclosure some specificity it may be noted that the subject matter of this invention has been applied to the coating of polystyrene pipe. In the case of such pipe, the pigment was dissolved in a solvent system such as for example one which does not attack the pipe. However, it is within the scope of this invention to use solvents for the pigment, the nature of which will depend upon the desired color of the finished product, which are inert with respect to the material of the pipe or insulation in the case of a wire. Preferably the solvent system will be relatively rapidly drying by evaporation of the solvent which action in some cases will be speeded up if the body being coated is heated as it may well be in the case of coating while extruding.

It is also within the scope of this invention to use many common forms of paints in suitable carriers, but this invention is not limited to the particular coating material as it appears that the resilient fabric smoothing sleeve is effective in all cases.

In order to provide a complete disclosure one suitable form of complete system is disclosed in the drawings, which system is characterized by the fact that coating goes on while the elongated body is being formed, in this case by extrusion.

Referring to FIG. 1, there is shown an apparatus for extruding a plastic pipe or tube. As shown the composition to be extruded in pipe form is charged into the hopper 10 which includes power feeding mechanism by means of which this plastic is heated and delivered through the conduit 12 to a hopper 14 supported on top of the extruder 16. Apparatus of this type is well known in the art and further details thereof are not necessary.

As is well understood, the plastic composition is heated to the proper working temperature, depending upon its nature, so that it can be fed to the extrusion head 18 of the extruder.

As is clear from FIG. 2, the pipe P issues from the orifice of the extruder in the form of a continuous tube. From there the tube passes through an aperture 20b in the end wall 20a of the coating box 20. If desired, and as is sometimes done, the aperture 20b can be of a predetermined fixed size so as to give the pipe P the desired external diameter by passing therethrough in frictional engagement therewith. As is sometimes the case, but not herein shown, the pipe may successively pass through several sizing orifices which will shape and dimension the extruded article. For example, the aperture 20b and the succeeding apertures can be of oval shape if an oval conduit is desired.

As shown in enlarged form in FIG. 2, a coating solution or mixture is supplied from the tank 22 which has a screen 22a supported over a portion of its upper end. Extending from the tank 22 is a coating supply pipe 24, which is connected to the outlet of a submerged type of float pump, not shown, but driven by the electric motor 46. The pipe 24 terminates in a suitable shaped nozzle 42 positioned at the sizing aperture 20b and controlled by a valve 40. Supported on the adjacent end of the coating box 20 and below the nozzle 42 is a receptacle 44 into which the excess coating solution C5 collects. The collected solution is returned by a drain pipe 26 onto the screen 22a through which is passes back into the tank 22.

The coated pipe P passes from the coating box 20 to and through a cooling chamber 28, which is diagrammatically shown in FIG. 1. The cooling chamber contains either a circulating body of cooling water or may contain nozzles for spraying water onto the pipe as it moves lengthwise through the cooling chamber.

The pipe P is moved lengthwise by means of a power driven capstan assembly 30 of a type commercially available and therefore not shown herein in detail. If it is desired to print data or advertising matter on the pipe this is done in the printing assembly 32. From there the pipe passes along and is supported by a so-called run-out conveyor 34. From the conveyor it passes through a measuring machine 36, and then on to a take-up or spooling assembly 38.

It will be understood that basically substantially all of the component sub-assemblies of this system are well known and commercially available and are therefore subject to variation in detail depending upon the nature of the article being made and its specifications.

The important feature of this system is the provision of a novel means of smoothing the coating C deposited on the pipe P. While the excess coating material is removed from the pipe through sizing orifices 20b it is not sufficiently smooth and uniform in thickness for a finished product. Therefore, in accordance with this invention the roughly coated pipe passes through an aperture 20d in a wall 20c, which aperture is larger than the coated pipe. Supported on the wall 20c and on the axis of the moving pipe, is a smoothing sleeve 54. As shown in better detail in FIG. 3, this sleeve is supported by a ring 50 which is supported on the wall 20c by a series of pins or spacers 52. Encircling the ring is one end of a knitted fabric sleeve 54 which overlies the periphery of the ring and is firmly held in place by means of a snap ring 56. The coating FC of the pipe P as it issues from the sleeve is extremely smooth and uniform and the thickness of the coating is substantially consistent.

The sleeve 54 is preferably formed without a seam. Thus for this purpose the sleeve is in the form of a circular knit tube which is therefore seamless and is of such length as to insure a smooth surface on the finished product. The length of the sleeve will vary depending upon the speed of movement of the pipe, its diameter, and the nature of the coating solution. It is preferable that the sleeve be knit of relatively seamless stitches in order to produce a fine or extremely smooth coating. This sleeve may be of such diameter as to snugly fit the pipe, but here again the tightness of fit will vary with the nature of the fabric, the size of the stitch, the size of the pipe, and its speed of movement.

The effectiveness of this sleeve depends in part upon its resilience, which is a characteristic of a tubular knit fabric and which can be varied by using different yarns in knitting the sleeve and in some cases even including some elasticized or elastic yarns. As previously mentioned the yarns may be of natural or synthetic materials in the form of yarns which may in themselves be elastic. Thus the elasticity of the sleeve will depend first on the fact that it is a knitted fabric, and secondly on the fact that in part or in whole elastic yarns are used to form it. If the sleeve is knit with too loose a stitch there may result irregularities in the surface coating which are undesirable for most uses. The sleeve could be made of a knitted flat fabric seamed into tubular form when the mark made by the seam in the coating is not objectionable.

More specifically, the sleeve may be knitted of cotton with the interspersion of some elastic yarn of a different material not attacked by the solvents of the coating, if desired. More specifically, a suitable sleeve for this purpose can be a cotton fleece lined jersey fabric, but is not necessarily limited to this form of knitted fabric. An important characteristic of a wiping sleeve of this type results from its inherent flexibility and resilience, permitting it to conform to any irregularities in the pipe, that is to hug its surface. Since it is mechanically flexible in all directions it is admirably suited to this purpose.

In view of the above descriptive material it will be apparent to those skilled in the art that the subject matter of this invention is capable of some variation in its detail, and it is preferred therefore that the scope of the invention be defined by the appended claims rather than by the illustrative example included herein.

What is claimed is:

1. In an apparatus of the type described the combination comprising means for advancing an elongated body in an axial direction along a straight line, means for applying a fluid coating to the surface of said body, and a knitted tubular elastic fabric sleeve mounted on the axis of said body through which it passes, said sleeve snugly engaging the surface of said body to smooth the applied coating.

2. In the apparatus of claim 1, said sleeve being circular knit.

References Cited by the Examiner
UNITED STATES PATENTS

| 2,548,127 | 4/51 | Slavens | 15—210.2 |
| 2,649,757 | 8/53 | Diamond | 118—125 X |
| 2,965,068 | 12/60 | Pharris et al. | 118—125 X |
| 3,032,812 | 5/62 | Van Riper | 15—210.2 X |

RICHARD D. NEVIUS, *Primary Examiner.*

M. V. BRINDISI, *Examiner.*